United States Patent
Bienvenu et al.

(10) Patent No.: US 12,109,639 B2
(45) Date of Patent: Oct. 8, 2024

(54) METHOD FOR MANUFACTURING A STRUCTURAL AND/OR ACOUSTIC PANEL FOR A NACELLE OF AN AIRCRAFT PROPULSION UNIT, AND CORRESPONDING DEVICE

(71) Applicant: Safran Nacelles, Gonfreville l'Orcher (FR)

(72) Inventors: Philippe Bienvenu, Gonfreville l'Orcher (FR); Aurélie Soula, Gonfreville l'Orcher (FR); Thomas Perrotin, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 92 days.

(21) Appl. No.: 16/870,391

(22) Filed: May 8, 2020

(65) Prior Publication Data
US 2020/0316701 A1 Oct. 8, 2020

Related U.S. Application Data

(63) Continuation of application No. PCT/FR2018/052768, filed on Nov. 8, 2018.

(30) Foreign Application Priority Data

Nov. 8, 2017 (FR) ..................................... 1760487

(51) Int. Cl.
*B23K 20/02* (2006.01)
*B23K 1/00* (2006.01)
(Continued)

(52) U.S. Cl.
CPC .......... *B23K 1/0014* (2013.01); *B23K 20/021* (2013.01); *B23K 20/24* (2013.01);
(Continued)

(58) Field of Classification Search
None
See application file for complete search history.

(56) References Cited

U.S. PATENT DOCUMENTS 3,011,254 A * 12/1961 Melill .................. B23K 1/0014
228/181
3,110,961 A * 11/1963 Melill .................. B23K 1/0014
228/181
(Continued)

FOREIGN PATENT DOCUMENTS

EP 2879830 6/2015
WO 2016062978 4/2016

OTHER PUBLICATIONS

Mis, Michal et al., Numerical study of radiation and temperature phenomena for improved super-plastic sheet metal forming, Materials Science Forum, 2012, pp. 170-179, vol. 735, Trans Tech Publications, Switzerland.
(Continued)

*Primary Examiner* — Devang R Patel
(74) *Attorney, Agent, or Firm* — Burris Law, PLLC

(57) ABSTRACT

A method and a device for manufacturing a structural and/or acoustic panel for a nacelle of an aircraft propulsion assembly involves heating, by producing electromagnetic radiation, at least one skin of the structural and/or acoustic panel in such a way as to assemble this skin with a cellular structure of the structural and/or acoustic panel, by diffusion brazing or welding. This heating device can also be used to shape the skin to the cellular structure prior to assembly.

4 Claims, 3 Drawing Sheets

(51) Int. Cl.
B23K 20/24 (2006.01)
B64D 29/00 (2006.01)
B23K 101/00 (2006.01)
B23K 101/02 (2006.01)
B64D 27/16 (2006.01)

(52) U.S. Cl.
CPC ........ B64D 29/00 (2013.01); *B23K 2101/006* (2018.08); *B23K 2101/02* (2018.08); *B64D 27/16* (2013.01)

(56) References Cited

U.S. PATENT DOCUMENTS

| | | | |
|---|---|---|---|
| 3,612,387 A | 10/1971 | Rathbun | |
| 3,743,493 A * | 7/1973 | Lemelson | C03B 23/24 |
| | | | 445/24 |
| 3,930,605 A | 1/1976 | Merrill et al. | |
| 5,705,794 A | 1/1998 | Gillespie et al. | |
| 5,914,064 A * | 6/1999 | Gillespie | B21D 26/055 |
| | | | 219/615 |
| 6,180,932 B1 * | 1/2001 | Matsen | B23K 1/002 |
| | | | 219/615 |
| 6,511,759 B1 * | 1/2003 | Schalansky | H05B 3/28 |
| | | | 228/186 |
| 9,789,556 B2 * | 10/2017 | Bienvenu | B23K 1/0018 |
| 2001/0052388 A1 | 12/2001 | Claude | |
| 2006/0086774 A1 * | 4/2006 | Sanders | B23K 20/122 |
| | | | 228/112.1 |
| 2006/0210821 A1 * | 9/2006 | Eilert | B29D 24/005 |
| | | | 428/543 |
| 2013/0019996 A1 * | 1/2013 | Routledge | B23K 1/206 |
| | | | 219/85.22 |
| 2013/0112344 A1 | 5/2013 | Le Monnier | |
| 2015/0136841 A1 * | 5/2015 | Bienvenu | B23K 3/087 |
| | | | 228/173.6 |
| 2016/0151856 A1 * | 6/2016 | Cook | B23K 35/3613 |
| | | | 228/122.1 |
| 2017/0243851 A1 * | 8/2017 | Rangelov | H01L 24/97 |

OTHER PUBLICATIONS

International Search Report for International Application PCT/FR2018/052768, mailed Mar. 11, 2019.

* cited by examiner

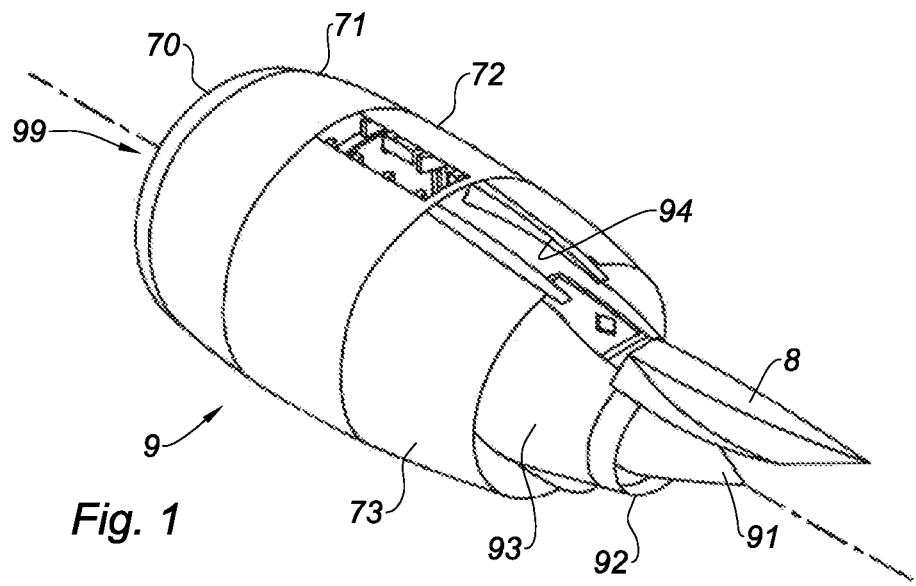
Fig. 1
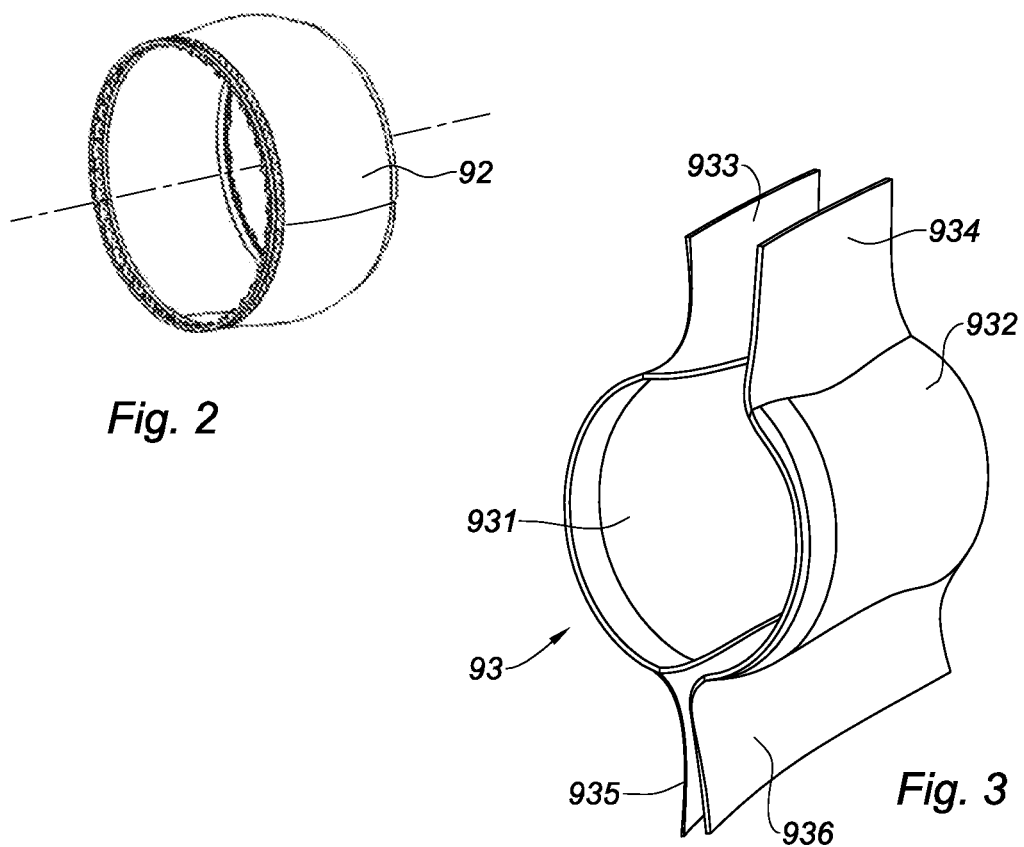
Fig. 2
Fig. 3

METHOD FOR MANUFACTURING A STRUCTURAL AND/OR ACOUSTIC PANEL FOR A NACELLE OF AN AIRCRAFT PROPULSION UNIT, AND CORRESPONDING DEVICE

CROSS-REFERENCE TO RELATED APPLICATIONS

This application is a continuation of International Application No. PCT/FR2018/052768, filed on Nov. 8, 2018, which claims priority to and the benefit of FR 17/60487 filed on Nov. 8, 2017. The disclosures of the above applications are incorporated herein by reference.

FIELD

The present disclosure relates to the field of manufacturing parts for a nacelle of an aircraft propulsion unit such as a nacelle of an aircraft turbojet engine. More specifically, the present disclosure concerns a method for manufacturing a structural and/or acoustic panel in particular for an ejection conduit or inner fixed structure of such a nacelle. The present disclosure also concerns a device implementing such a method.

BACKGROUND

The statements in this section merely provide background information related to the present disclosure and may not constitute prior art.

In this field, it is known to implement structural panels commonly called "sandwich panels." Such a panel typically comprises two skins and a cellular structure linking the two skins. Typically, the cellular structure consists of transverse partition walls contributing to the structural strength of the panel by ensuring, in particular, the linkage between the two skins and withstanding mechanical and thermal stresses. Such a cellular structure allows reducing the overall mass of the panel.

Such a panel may further have an acoustic treatment function in order to attenuate the noise generated by the propulsion unit. For this purpose, the transverse partition walls of the cellular structure are arranged so as to delimit cells forming Helmholtz cavities. One of the skins, oriented towards the source of the noise, is permeable to air in order to absorb the acoustic energy within the cellular structure.

In the present document, the expression "manufacture of a structural and/or acoustic panel" refers, on the one hand, to the manufacture of the structural and/or acoustic panel as such, in particular by assembly of the skins and the cellular structure and, on the other hand, the manufacture of the skins and the cellular structure, in particular by forming of these elements to be assembled.

There are known from the prior art techniques for assembling a structural and/or acoustic panel by brazing or by diffusion-welding. Brazing consists of heating up to its melting temperature a filler metal, which may be in the form of a braze foil or a powder or a tape (powder in an organic binder). Typically, the braze foil is placed between a skin and the cellular structure of the panel. The filler metal is selected so that its melting temperature is lower than the melting temperature of the elements to be assembled, that is to say in this example the skin and the cellular structure. In contrast with brazing, diffusion-welding does not require any filler metal.

In order to dispose the elements to be assembled in the configuration in which they should be brazed or welded, it is known to apply a gaseous pressure allowing pressing and holding these elements in such a configuration.

In these different techniques of the prior art, the assembly is carried out within a vacuum enclosure, or vacuum furnace, the rise in the temperature thereof is generally achieved by electric resistances.

Heating by electric resistances is relatively long and may require the use of a thermal bell in order to limit thermal gradients between the inner skin and the outer skin, heating generally taking place on the side of the outer skin.

Other drawbacks of the techniques of the prior art concern the impossibility to modulate the temperatures on the parts and the long duration of a manufacturing cycle. The parts are generally formed separately and then assembled by heating.

Moreover, an inner fixed structure of a nacelle generally has non-planar surfaces whose shape may be relatively complex. Accordingly, the shape to be imparted onto a structural and/or acoustic panel for an inner fixed structure of a nacelle, in particular, may be relatively complex.

The assembly of a structural and/or acoustic panel to a non-planar and/or relatively complex shaped surface may require completing the forming of a skin, prior to the assembly of this skin with the corresponding cellular structure. For this purpose, it is known to hot form the skin under gaseous pressure, the pressure allowing pressing the skin against the cellular structure to which it conforms by the effect of the temperature.

Such a hot forming and/or assembly under gaseous pressure may result in a local squeezing of the cellular structure. Indeed, the central portion of the skin is deformed more rapidly than its ends such that the cellular structure is subjected to mechanical stresses that are not uniform in the space, that is to say to a force pushing the skin against the cellular structure that is more considerable at the level of the central portion of the skin than at the level of its ends.

Cold hydroforming is an alternative solution which has other drawbacks, such as the risks of water leakages and burst of the bladder or of the part. Furthermore, this technique is difficult to apply on an industrial scale and does not enable forming of complex shapes.

SUMMARY

This section provides a general summary of the disclosure and is not a comprehensive disclosure of its full scope or all of its features.

The present disclosure relates to a method for manufacturing a structural and/or acoustic panel for a nacelle of an aircraft propulsion unit. The structural and/or acoustic panel comprises two metallic skins and a metallic cellular structure, for example made of titanium. In one form, the cellular structure is of the honeycomb type. The method comprises an arrangement of one of the two skins, called the working skin, so that the working skin delimits a first volume and a second volume of an enclosure. The method also comprises an arrangement of the cellular structure within the second volume of the enclosure. According to the present disclosure, the method further comprises an assembly step during which the working skin is heated by electromagnetic radiation so as to assemble the working skin and the cellular structure by brazing or diffusion-welding. In one form, the electromagnetic radiation may be an infrared radiation. Alternatively, this radiation may be a laser radiation.

Such a method allows heating the elements to be assembled in a selective manner, thanks to the directivity of the electromagnetic radiation. Thus, it is possible to selectively heat the working skin by limiting or canceling the rise in the temperature of the tooling.

The directivity of the heating also allows simplifying the sealing thanks to the preservation of relatively cold areas. Thus, it is possible to provide tightness of the enclosure by rubber seals.

In comparison with techniques of heating by electric resistances, the method according to the present disclosure allows reducing the duration of manufacture of the structural and/or acoustic panel and avoiding the use of a thermal bell.

In at least one form, the method may further comprise a gaseous pressurization of the first volume of the enclosure so as to press and hold the working skin against the cellular structure.

In one form, the method may further comprise, before the assembly step, a forming step during which the working skin is heated by electromagnetic radiation so as to conform the working skin to the cellular structure, the first volume of the enclosure being pressurized by a gas during this forming step. The electromagnetic radiation may be an infrared radiation or a laser radiation and may in a variation be made by a heater common to this forming step and to the assembly step.

In one form, the heating by electromagnetic radiation during the forming step may be carried out by selective heating of the working skin from ends up to a center of this working skin, so as to uniformize its deformation during the forming step.

A forming step carried out in this manner allows obtaining a more homogeneous skin thickness and, for some materials such as the alloy UNS N06625 sold under the trademark INCONEL® 625, thus reducing the possibility of a necking phenomenon.

In addition, a forming step carried out in this manner allows avoiding or limiting the phenomenon of squeezing of the cellular structure at the level of the central portion of the working skin, in comparison with the techniques of hot forming under gaseous pressure of the prior art, while avoiding resorting to cold hydroforming techniques.

In some forms, the method may further comprise a vacuuming of the second volume of the enclosure using a pump.

In one form, the method may comprise a vacuuming of the first volume of the enclosure using a pump, before placing the first volume of the enclosure under gaseous pressure.

The vacuuming allows avoiding the oxidation of the elements to be assembled and, in case of assembly by brazing, improves the spreading of the brazed joint and of the mechanical properties of the structural and/or acoustic panel.

In comparison with a vacuum furnace of the prior state of the art, each of the first volume and the second volume has a smaller volume, which reduces the pumping time.

The present disclosure also concerns a device for manufacturing a structural and/or acoustic panel for a nacelle of an aircraft propulsion unit, the structural and/or acoustic panel comprising two metallic skins and a metallic cellular structure, for example made of titanium. In another form, the cellular structure may be of the honeycomb type. This device comprises an enclosure adapted to receive one of the two skins, called the working skin, so that the working skin delimits a first volume and a second volume of the enclosure. The enclosure is adapted to receive the cellular structure within the second volume. According to the present disclosure, this device further comprises a heating device, or heater, arranged so as to heat the working skin by electromagnetic radiation so as to assemble the working skin and the cellular structure by brazing or diffusion-welding during an assembly step. In yet another form, the electromagnetic radiation may be an infrared radiation. Alternatively, this radiation may be a laser radiation.

In one form, the device may further comprise a device for pressurizing the first volume of the enclosure with a gas, this pressurizing device being adapted to press and hold the working skin against the cellular structure.

In at least one form, the heater may be further arranged so as to heat the working skin by electromagnetic radiation so as to conform the working skin to the cellular structure during a forming step preceding the assembly step. In this form, the device may be arranged so as to place the first volume of the enclosure under pressure during the forming step.

In another form, the heater may be arranged so as to heat the working skin, during the forming step, by electromagnetic radiation in a selective manner from ends up to a center of this working skin, so as to uniformize its deformation during the forming step.

In one form, the device may comprise a pump arranged so as to vacuum the first volume and/or the second volume of the enclosure.

The advantages conferred by the method according to the present disclosure are also found in the device according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic view of a nacelle of an aircraft turbojet engine to which the teachings of the present disclosure are applied;

FIG. 2 illustrates an ejection nozzle of an ejection conduit of a nacelle of an aircraft turbojet engine to which the teachings of the present disclosure are applied;

FIG. 3 illustrates an inner fixed structure of a nacelle of an aircraft turbojet engine, in the form of two half-barrels with their 12 o'clock and 6 o'clock islands to which the teachings of the present disclosure are applied;

Figure 4:
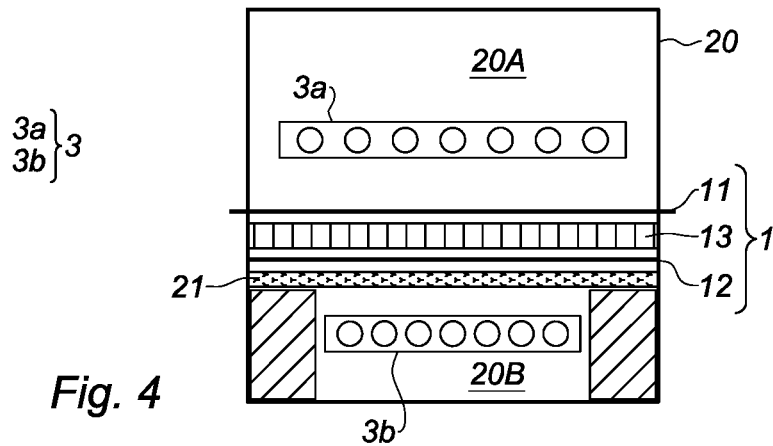
FIGS. 4 to 7 illustrate devices according to the present disclosure adapted for the manufacture of panels with different shapes.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a method and a device for manufacturing a structural and/or acoustic panel for a nacelle of an aircraft propulsion unit.

An example of a nacelle 9 is illustrated in FIG. 1. This nacelle 9 hangs from a pylon 8 intended to be fastened to a wing (not represented) of an aircraft (not represented). The nacelle 9 comprises an upstream section 71 provided with a lip 70 forming an air inlet 99, a middle section 72 receiving a fan (not represented) of a bypass turbojet engine (not represented), and a downstream section 73.

The downstream section 73 includes an inner fixed structure 93 surrounding an upstream portion of the turbojet engine (not represented) and an outer fixed structure 94. The inner fixed structure 93 and the outer fixed structure 94 delimit an annular flow path defining a passage for a main air flow penetrating into the nacelle 9 at the level of the air inlet 99.

The nacelle 9 comprises an ejection conduit including an ejection plug 91 and an ejection nozzle 92. The ejection nozzle 92 is represented in FIG. 2. The ejection plug 91 and the ejection nozzle 92 of the ejection conduit define a passage for a hot air flow coming out of the turbojet engine (not represented).

FIG. 3 shows two parts 931 and 932 of the inner fixed structure 93. The two parts 931 and 932 have a half-barrel like shape so that, once assembled, they confer to the inner fixed structure 93 a barrel like shape.

The inner fixed structure 93 also comprises parts 933, 934, 935, 936 to provide a structural linkage between the inner fixed structure 93 and the outer fixed structure 94. The parts 933 and 934 constitute a so-called 12 o'clock island placed vertically above the barrel. The parts 935 and 936 constitute a so-called 6 o'clock island placed vertically below the barrel.

The present disclosure covers the manufacture of structural and/or acoustic panels in particular for an ejection nozzle 92 of an ejection conduit as illustrated in FIG. 2, for an inner fixed structure 93 as illustrated in FIG. 3, or for any other part of the nacelle 9.

An acoustic panel 1 is illustrated in particular in FIG. 4 which shows a device according to the present disclosure. The acoustic panel 1 comprises two metallic skins 11 and 12 and a honeycomb-type metallic cellular structure 13. As a non-limiting example, the elements 11, 12 and 13 may be made of the same material such as titanium. Alternatively, the elements 11, 12 and 13 may be made of different materials: for example, the elements 11 and 12 may be made of a first metallic material and the element 13 may be made of a second metallic material; or else, the elements 11, 12 and 13 may be made respectively of a first, a second and a third material.

The examples of FIGS. 4 to 7 illustrate a simultaneous assembly of the elements 11, 12 and 13. Nonetheless, the present disclosure allows assembling these elements separately, for example only the elements 11 and 13.

The device according to the present disclosure comprises an enclosure 20 adapted to receive at least one of the two skins, called the working skin 11, so that the working skin 11 delimits a first volume 20A and a second volume 20B of the enclosure 20. This delimitation may be achieved by pinching the working skin 11 between pinch areas (not represented) of the enclosure 20.

Figure 5:
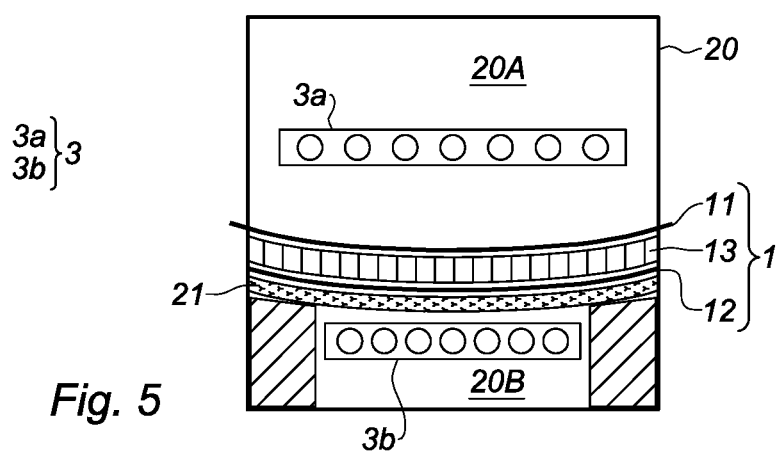
Figure 6:
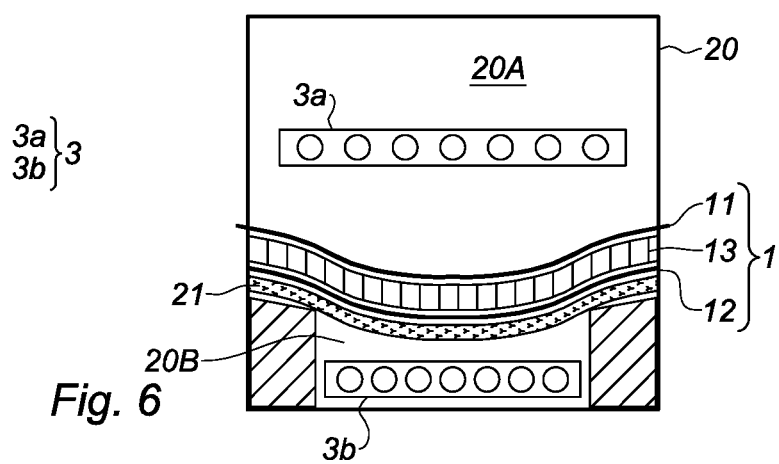

Furthermore, the enclosure 20 is adapted to receive the cellular structure 13 within the second volume 20B. In the examples of FIGS. 4 to 6, the second volume 20B of the enclosure 20 receives both the cellular structure 13 as well as the skin 12.

Figure 8:
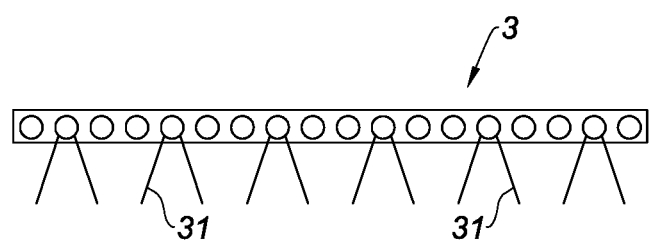
FIG. 8 illustrates a heater implemented in a device according to the present disclosure.

The device according to the present disclosure comprises a heating device 3 represented separately in FIG. 8. The heating device 3 is arranged so as to produce an electromagnetic radiation 31 which may be an infrared radiation, a laser radiation, or other.

Referring to FIG. 4, the heating device 3 comprises a heater 3a arranged so as to heat the working skin 11 by electromagnetic radiation so as to assemble the working skin 11 and the cellular structure 13 by brazing or diffusion-welding during an assembly step. For this purpose, the heater 3a is placed in the first volume 20A of the enclosure 20. In other words, the method according to the present disclosure comprises such an assembly step during which the working skin 11 is heated by electromagnetic radiation 31 so as to assemble the working skin 11 and the cellular structure 13 by brazing or diffusion-welding.

In this example, the heating device 3 also comprises a heater 3b. During the assembly step, a tooling 21 on which the skin 12 is resting, is also heated by electromagnetic radiation 31, using the heater 3b. This allows improving the assembly of the panel and in particular of the skin 12 with the cellular structure 13. Nonetheless, heating of the tooling 21 is optional.

In one form, the first volume 20A of the enclosure 20 is placed under gaseous pressure so as to press and hold the working skin 11 against the cellular structure 13 and where appropriate the cellular structure 13 against the skin 12.

In this example, the skin 12 is made permeable to air for example using piercings (not represented). Hence, vacuuming is also obtained within the cellular structure 13.

In the example of FIG. 4, the elements 11, 12 and 13 are planar and form, after assembly, a planar panel.

It arises from the examples of FIGS. 2 and 3 that some parts of the nacelle 9 have non-planar and/or relatively complex shaped surfaces. Hence, the acoustic panels equipping or forming such parts should have such non-planar and/or relatively complex shaped surfaces which may include completing the forming of a skin before the assembly thereof with the preformed cellular structure.

Figure 7:
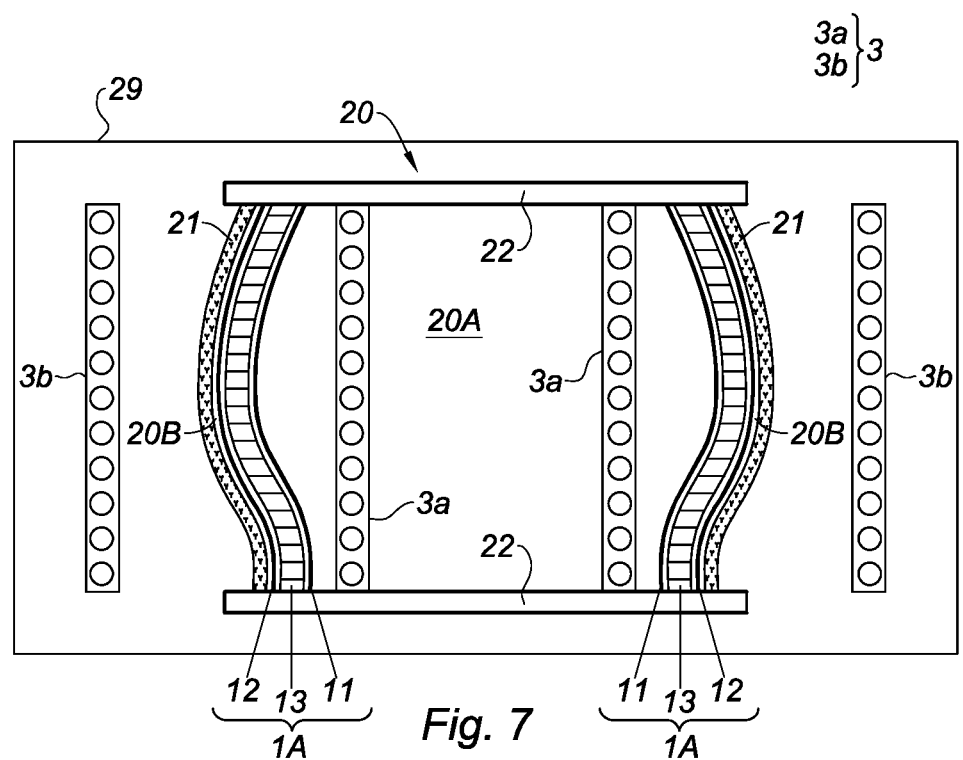

FIGS. 5 to 7 show devices comprising non-planar elements that are to be assembled to which reference is made in the following.

According to the present disclosure, a forming step may be carried out before the assembly step. During this forming step, the working skin 11 is heated by electromagnetic radiation 31, in the example of FIGS. 5 to 7 using the heater 3a, so as to conform the working skin 11 to the cellular structure 13. During this forming step, the first volume 20A of the enclosure 20 is placed under gaseous pressure, which allows pushing the working skin 11 against the cellular structure 13. When the skin 12 is present, this also allows better pressing the skin 12 on the tooling 21 throughout the cellular structure 13 and the working skin 11.

Hence, the working skin 11 is in one form a solid skin, that is to say airtight, so as to enable a differential pressurization of the first volume 20A and of the second volume 20B of the enclosure 20.

In a form that is compatible with the different variations illustrated in FIGS. 4 to 7, the heating by electromagnetic radiation during the forming step is carried out by selective heating of the working skin 11 from ends up to a center of this working skin 11, so as to uniformize its deformation during the forming step.

In the example of FIG. 6, the acoustic panel 1 corresponds to half of the inner fixed structure as illustrated in FIG. 3, for example that comprising the part 931 (the half barrel) and the two parts 933 and 935.

In order to inhibit the oxidation of the elements to be assembled and provide contact between these elements, the second volume 20B of the enclosure 20 may be vacuumed using a pump during the thermal cycle.

The first volume 20A of the enclosure 20 may also be vacuumed using a pump during the thermal cycle, in the forms that do not involve placing this first volume 20A under gaseous pressure. In the variations in which the first volume 20A is placed under gaseous pressure, the first volume 20A may also be vacuumed using a pump before placing it under gaseous pressure.

As a non-limiting example, with reference to FIGS. 4 to 6, an inert gas pressure is applied in the first volume 20A and therefore on the working skin 11 as soon as the temperature reaches 800° C. and is maintained until the end of the thermal cycle. Optionally, the pressure may be reduced after solidification of the brazed joint.

FIG. 7 illustrates the case of an enclosure 20 arranged so as to assemble an acoustic panel 1a in the form of a rotationally symmetrical part, this acoustic panel 1a comprising the working skin 11, the cellular structure 13 and the skin 12. For example, the acoustic panel 1a manufactured according to the present disclosure may include an ejection nozzle 92 as illustrated in FIG. 2.

Unlike the forms of FIGS. 4 to 6, the enclosure 20 is delimited by the tooling 21 and by walls 22, this enclosure 20, itself, may be placed into a chamber 29 receiving a heater 3b for the heating of the tooling 21.

Of course, the present disclosure is not limited to the examples that have just been described and numerous arrangements may be brought to these examples yet without departing from the scope of the present disclosure. For example, the present disclosure also allows manufacturing structural panels that are not intended for an acoustic treatment function.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a structural and/or acoustic panel for a nacelle of an aircraft propulsion unit, the structural and/or acoustic panel comprising two metallic skins and a metallic cellular structure, the method comprising an arrangement of one of the two metallic skins, called a working skin, such that the working skin delimits a first volume and a second volume of an enclosure, and an arrangement of the metallic cellular structure within the second volume of the enclosure, wherein the method further comprises:
   placing the working skin, which is not deformed at all, by pinching between pinch areas of the enclosure;
   applying a gas pressure in the first volume of the enclosure so as to press and hold the working skin against the metallic cellular structure;
   deforming the working skin in the enclosure by heating the working skin with electromagnetic radiation when the first volume of the enclosure is pressurized by a gas such that the working skin is deformed into a shape conforming to a shape of the metallic cellular structure, the heating by the electromagnetic radiation during the deforming being carried out by selectively heating the working skin from ends up to a center of the working skin so as to uniformize deformation of the working skin; and
   heating the working skin by infrared electromagnetic radiation by a first heating device placed in the first volume of the enclosure so as to assemble the working skin to the metallic cellular structure by at least one of brazing and diffusion-welding.

2. The method according to claim 1, further comprising a vacuuming of at least one of the first volume and the second volume of the enclosure using a pump.

3. The method according to claim 1, further comprising providing infrared electromagnetic radiation by a second heating device to a tooling on which the other of the two metallic skins is disposed.

4. The method according to claim 3, further comprising placing the second heating device in the second volume of the enclosure.

* * * * *